Aug. 23, 1960 — A. A. STEFUCZA — 2,949,735
CONTROL APPARATUS FOR A PROPULSION ENGINE
Filed Dec. 30, 1955 — 2 Sheets-Sheet 2

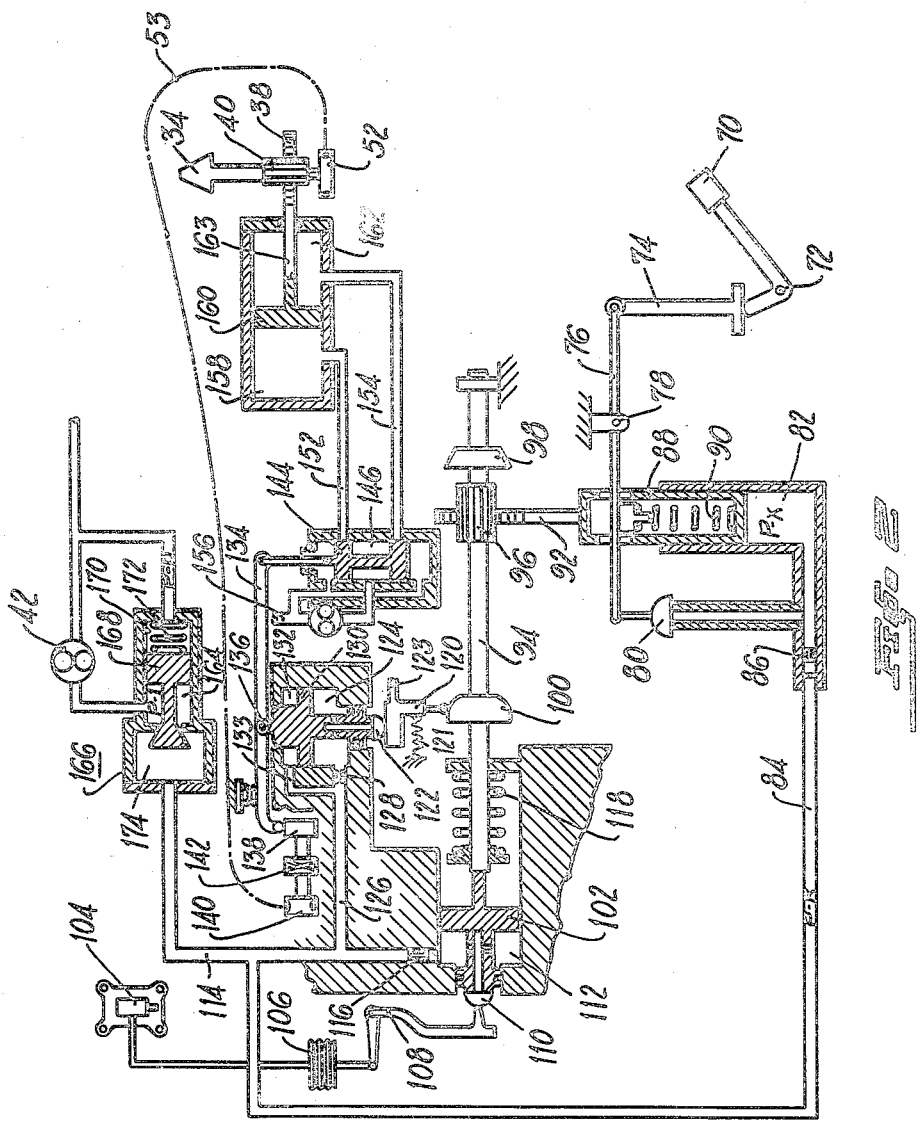

INVENTOR.
ALEXANDER ANDREW STEFUCZA
BY
*W. Brodahl*
ATTORNEY

United States Patent Office 2,949,735
Patented Aug. 23, 1960

2,949,735
CONTROL APPARATUS FOR A PROPULSION ENGINE

Alexander A. Stefucza, South Bend, Ind., assignor to Bendix Aviation Corporation, South Bend, Ind., a corporation of Delaware Filed Dec. 30, 1955, Ser. No. 556,747

5 Claims. (Cl. 60—39.29)

The present invention relates to control apparatus for an engine, and more particularly to control apparatus for the compressor air flow guide members of a gas turbine engine having a compressor unit.

It is an object of the present invention to provide an improved control apparatus for an engine.

It is an another object of the present invention to provide an improved fuel control apparatus for a gas turbine engine.

It is a different object of the present invention to provide an improved engine control system characterized by being more accurate and satisfactory in operation.

It is an additional object of the present invention to provide an improved engine control apparatus for an engine including a control member, said apparatus being operative for positioning said control member wherein said apparatus has a higher operative gain such that for a given control member position error the control apparatus is operative to furnish a greater position correction effect relative to said control member.

It is a further object of the present invention to provide an improved control apparatus for positioning the air flow guide members or vanes of a gas turbine engine such that an improved operation of the guide members thereby results to provide an improved positioning of the latter members respectively between their closed positions and their open positions.

It is still another object of the present invention to provide an improved gas turbine engine guide vane control apparatus including a high pressure fluid source for simplifying the control apparatus required to satisfactorily position the guide vanes as desired.

These and other objects and advantages of the present invention will be readily apparent from the following detailed description taken in conjunction with the accompanying drawings wherein:

Figure 2 is a schematic view of the guide vane control apparatus of Figure 1 and a portion of the main fuel control apparatus shown in Figure 1.

Figure 1:
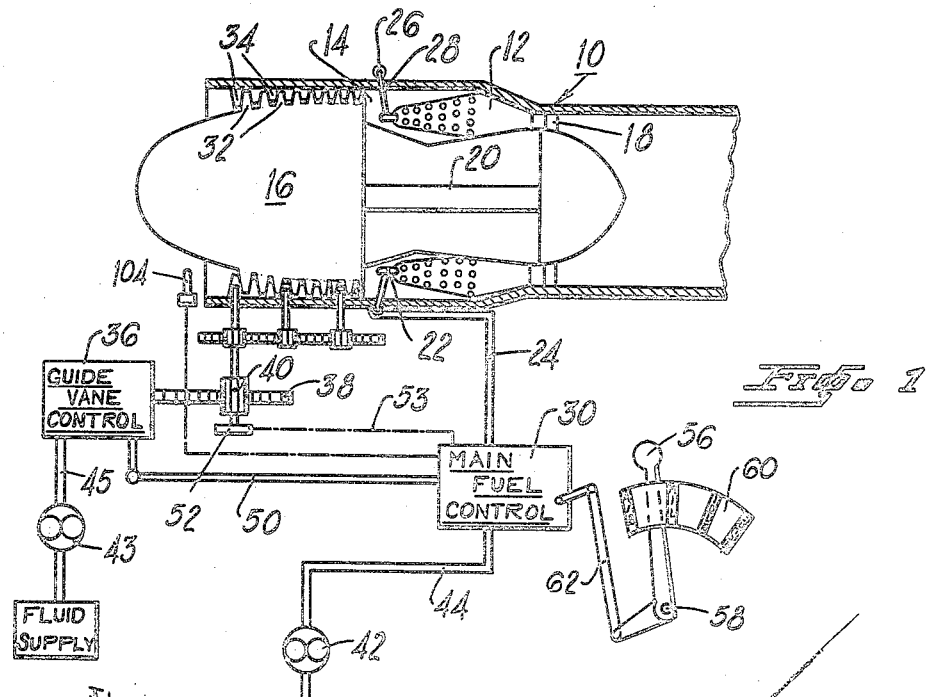
Figure 1 is a schematic view of a gas turbine engine including control apparatus in accordance with the present invention.

Referring now to Figure 1 there is shown a gas turbine engine 10 having one or more combustion chambers 12 mounted in a casing having a header or air intake section 14. A dynamic or axial compressor 16 is shown and is driven by means of a turbine unit 18 through a connecting drive shaft 20. Each of the combustion chambers 12 is provided with a burner nozzle 22 to which metered fuel is supplied under pressure by way of fuel conduit 24 from a main fuel control 30 by way of fuel manifold 26 and individual fuel lines 28. The compressor 16 includes a plurality of rotor vanes 32 and a plurality of stator guide vanes 34. The plurality of stator guide vanes 34 or certain of these may be interconnected as shown in Figure 1, and angularly adjustable by means of a guide vane control apparatus 36 through a rack 38 and pinion 40, which latter pinion 40 is connected to certain of the stator vanes 34. The plurality of stator vanes 34 may be interconnected such that they are in common angularly adjusted position as desired. A first fluid pump 42 is connected through a fuel conduit 44 to the main fuel control apparatus 30. A second fluid pump 43 is provided and connected to the guide vane control apparatus 36 through a fluid conduit 45. The main fuel control apparatus 30 is operatively connected to the guide vane control apparatus 36 through a mechanical linkage arm 50. A feedback connection is provided between the pinion 40 connected to the stator vanes 34 which feedback connection is provided through a sheave 52 connected to the pinion 40 and may comprise suitable feedback connection such as a positive drive flexible cable 53 to the main fuel control apparatus 30. A manual control lever 56 is provided and operative in the conventional manner with the throttle quadrant 60. The control throttle 56 is pivotally supported by support shaft 58 and is connected to the main fuel control apparatus 30 through the mechanical linkage arm 62.

Referring to Figure 2 there is shown a speed responsive weight 70 which is pivotally supported about shaft 72 for rotation in the well known manner with the drive shaft 20 of the gas turbine engine 10 shown in Figure 1. The output force of the speed weight 70 is applied through a connecting arm 74 to one end of a control lever 76 pivoted about support connection 78. The other end of the control lever 76 is operative to control the position of the servo control valve or half-ball 80 which controls the fuel pressure $P_X$ within a fuel chamber 82. Control fuel at servo regulated pressure $P_R$ is supplied through fuel conduit 84 and then passes through the servo orifice 86 to the fuel chamber 82. A pressure responsive piston member 88 is responsive to the fluid pressure within the fuel chamber 82 and acts through a compression spring 90 to apply a positioning force to the control lever 76 and further acts through the control arm including the rack 92 to rotate a control shaft 94 through a pinion member 96. The control shaft 94 carries a conventional acceleration cam 98 and a guide vane control cam 100, both of which cams are three dimensional cams and are further described in copending application Serial No. 499,432 filed on April 5, 1955 in the names of H. J. Williams, F. R. Rogers and B. J. Ryder and assigned to the same assignee as the present invention.

The control shaft 94 is rotated as a function of speed through the rack 92 and is moved axially as a function of temperature through the control temperature piston 102. A temperature responsive member 104 is provided at the inlet to the gas turbine engine 10 as shown in Figure 1. The output of the temperature responsive unit 104 is applied through a bellows member 106 to control the movement of a bell crank 108 and thereby position a servo pilot valve or half-ball 110 to control the fluid pressure within the fluid chamber 112. The latter fluid chamber is supplied control fluid at servo regulated pressure $P_R$ through the fluid conduit 114 and then through the servo orifice 116. The temperature responsive piston 102 is operative in conjunction with compression spring 118 to axially position the control shaft 94.

A cam follower member 120 is provided for riding on the guide vane control cam 100 and in turn controls the position of a servo pilot control valve or half-ball 122. The cam follower member 120 is supported by pivot connection 123 and held in position by tension spring member 121. The latter half-ball 122 controls the fluid pressure within a fluid chamber 124 which is supplied control fuel at servo regulated pressure $P_R$ through fluid conduit 126 and then through servo orifice 128. A control piston 130 is controlled by the fluid pressure within the fluid chamber 124 in conjunction with the control fluid at pressure $P_R$ within the fluid chamber 132 as supplied by fluid conduit 133. The servo piston 130 is so shaped that the control fluid at pressure $P_X$ within the fluid chamber 124 is exposed to a greater area surface than the control fluid at pressure $P_R$ within the fluid chamber 132. The output movement of the servo piston 130 is applied to the guide vane mixing control lever 134 through the pivot connection 136. One end of the control lever 134 rides on a feedback cam 138 which is positioned by means of a feedback sheave 140 acting through a torsion spring member 142. The opposite end of the control lever 134 controls the position of a fluid control transfer valve 144 which includes an annular recess 146. The latter annular recess 146 is supplied control fluid from a fluid pump 43 through fluid conduit 45. The transfer valve 144 is axially movable to selectively connect either the output fluid conduit 152 or the output fluid conduit 154 to the annular recess 146, and the other of these fluid conduits which is not connected to the annular recess 146 is connected to the inlet conduit 156 of the fluid pump 43. The fluid conduit 152 is connected to the fluid chamber 158 at a first side of an output piston 160. The fluid conduit 154 is connected to a second fluid chamber 162 at the other side of the output piston 160. The guide vane control 36 of Figure 1 includes the output piston 160 and the transfer valve 144 and associated apparatus including fluid conduits 152 and 154. The output piston 160 is connected through the rack 38 and pinion 40 to the guide vane member 34 of the compressor unit 16 as shown in Figure 1.

The main fuel pump 42 supplies fuel at pressure $P_1$ to the fuel chamber 164 of the servo regulator 166. A control piston 168 is positioned between the control fuel at pressure $P_1$ within the fuel chamber 164 and control fuel at pressure $P_0$ or the inlet pressure to the fuel pump 42 within the fuel chamber 170. A compression spring 172 in effect sets up the desired $P_R$ servo regulated pressure within the fuel chamber 174 which in turn is connected through the fuel conduit 114 to the servo orifices 86, 116 and 128.

Figure 3:
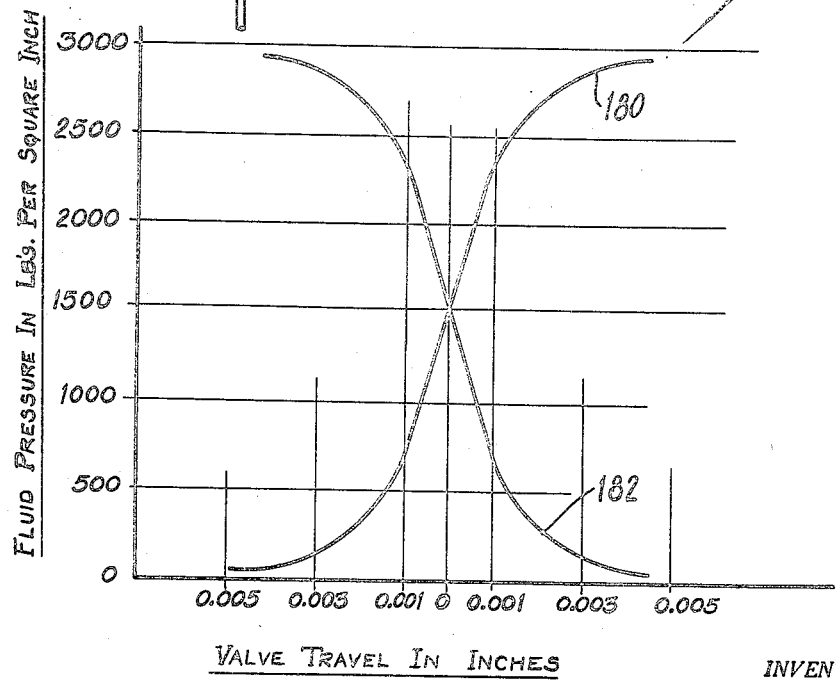
Figure 3 is a curve chart illustrating the operation of the fluid control valve of the guide vane control apparatus as shown in Figure 2.

In Figure 3 there is shown a curve chart illustrating the operation of the transfer control valve 144 of Figure 2. The chart sets forth the output fluid pressure in pounds per square inch as respectively connected to the fluid conduit 152 and fluid conduit 154 as a function of travel of the control valve 144 in inches. More specifically as the transfer control valve 144 moves axially in an upward direction the annular recess 146 is connected to the fluid conduit 152 and the fluid pressure in the latter fluid conduit 152 follows the curve 180 such that for the travel of the transfer control valve 144 in an upward direction for a distance of approximately .005 of an inch, the full output pressure of the fluid pump 43, which has been illustrated for the purpose of example only as 3,000 pounds per square inch, is applied to the fluid conduit 152. The other curve 182 represents the fluid pressure in pounds per square inch within the fluid conduit 154 for similar upward axial travel of the control transfer valve 144 and referring to the curve chart of Figure 3 a pressure of approximately 100 to 200 pounds per square inch would be present within the fluid conduit 154 for the above travel distance of 0.005 inch. A reversal of the travel of the transfer control valve 144 and in a downward direction to a distance of approximately .005 of an inch from the neutral or mid position would result in a reversal of the above described pressures within the respective fluid conduits 152 and 154 as illustrated by the curve chart in Figure 3. More specifically for the latter reversal of the transfer control valve 144, the curve 180 which represents the fluid pressure within the fluid conduit 152 shows that a pressure of approximately 100 to 200 pounds per square inch would be present within the fluid conduit 152 and a pressure of approximately 3,000 pounds per square inch would be present within the fluid conduit 154. The curve chart of Figure 3 shows that for a very slight physical travel of the shuttle or transfer control valve 144 an appreciable resultant differential pressure is applied to the respective fluid conduits 152 and 154 for moving the output control piston 160 and hence for adjusting the angular position of the compressor guide vanes 34.

In the operation of the apparatus shown in Figures 1 and 2 a speed and temperature signal are transmitted to the inlet guide vane cam follower 120 by the guide vane cam 100. The latter cam is three dimensional and is operated in a similar manner as the acceleration cam 98. The guide vane cam 100 is positioned rotationally by engine speed and axially by compressor inlet temperature through the temperature responsive member 104. The cam follower 120 is held in contact with the cam 100 by tension spring 121 with the cam follower 120 being pivoted about support connection 123. The cam follower 120 in turn controls the position of the servo pilot valve or half-ball 122. The seat of the latter servo control valve 122 is a part of the servo piston 130 and moves as the latter piston 130 moves. The piston 130 is exposed at its upper side to control fluid at servo regulated pressure $P_R$ and on its lower side to control fluid at servo pressure $P_X$ within the fuel chamber 124. Movement of the servo piston 130 is transmitted to the mixing control lever 134. The control lever 134 is pivotally connected to the servo piston 130 through pivotal connection 136 and rides on the feedback cam 138 with the compression spring 139 being provided to hold the control lever 134 against the feedback cam 138. The output of the control lever is applied to control the position of the transfer control valve 144.

In this respect the feedback cam 138 is rotated in position by the sheave or pulley 140 which is operatively connected through the positive drive flexible control cable 53 to the sheave or output pulley 52 which is connected to move with the guide vane 34. In this manner the axial position of the guide vane 34 is converted into feedback cam contour and applied to the mixing lever 134 through the feedback cam 138. The torsion spring 142 is provided to eliminate blacklash in the feedback system.

For a substantially constant operating temperature of about 59° F., the angular position of the control guide vanes 34 are controlled such that these vanes are in the closed position during start and idle operation of the gas turbine engine 10 and do not begin to open until approximately an engine speed of 4800 r.p.m. is attained. Thereafter the guide vanes 34 continue to open until they are fully opened at approximately 6720 engine r.p.m. For a substantially constant operating speed of approximately 5900 r.p.m. the guide vanes 34 may be fully open at about −60° F. inlet temperature and may be fully closed at about +310° F. inlet temperature. In this respect the opening and closing points of the inlet guide vanes 34 can be altered as the compressor inlet temperature or the engine operating speed changes. The inlet temperature is detected by the temperature responsive member 104 and transmitted as axial movement to the control shaft 94 through the temperature piston 102. This axially moves the guide vane cam 100 which is three dimensional with its surface contoured as a function of temperature as well as speed. An increase in engine speed from idle to military, and taking into consideration the action of the control transfer valve member 144 at a substantially constant compressor air temperature, will result in a change in the rotational or angular position of the guide vane cam 100. The speed weight 70 is responsive to engine speed changes. As engine speed increases progressively lower cam contour will be presented to the cam follower 120 which in turn will cause the servo piston half-ball 122 to move in a closing direction to increase the fluid pressure within the fluid chamber 124 to thereby move the servo piston 130 in an upward direction. The servo valve seat moves as part of the piston 130 until the half-ball 122 is restored to a floating position on the seat at which time the servo piston 130 will stop its upward movement. By the term floating position is meant a position of the half-ball 122 at which the fluid pressure within the fluid chamber 124 is controlled such that the resultant force of the latter fluid pressure acting against the effective area of the servo piston 130 exposed to the fluid within the fluid chamber 124 is in balance with the resultant force of the fluid pressure within the fluid chamber 132 times the effective area of the servo piston 130 exposed to the latter fluid pressure, plus any external loading forces, such as the loading due to the compression spring 139 and the like.

This upward movement of the servo piston 130 results in an upward movement of the control transfer valve 144 to thereby increase the fluid pressure within the fluid conduit 152 and to decrease the fluid pressure within the fluid conduit 154, as illustrated by the curves of Figure 3, such that the output control piston 160 is moved to the right and the guide vane 34 is rotated accordingly. In actual practice for an increase in engine speed the guide vanes 34 is moved in an opening direction, with the fully open direction corresponding to a position of the guide vanes 34 which is substantially parallel to the main direction of the air flow through the gas turbine engine 10. As the guide vane 34 begins to move open the positive drive flexible cable 53 supplies a position feedback signal to reposition the feedback cam 138 proportional to the amount of movement of the guide vanes 34 toward their open position. In this respect, the feedback cam 138 is turned toward a progressively higher cam rise such that the control transfer valve 144 is returned to its null or neutral position thus stopping any further guide vane motion. The resultant action of the control transfer valve 144 in returning toward its null position tends to restrict the oil pressure within the fluid conduit 152 and to restrict the oil drain from the fluid conduit 154 to slow down the rate of guide vane opening until a balance is attained between the rise of the feedback cam 138 and the position of the servo piston 130. When such a balance is attained the control transfer valve 144 is restored to its mid position and the oil pressures within the fluid conduit 152 and the fluid conduit 154 are substantially equal. In this respect it should be here noted that in actual practice the passage of air past the guide vanes 34 may result in a loading effect on the output control piston 160, and some fluid pressure differential between the fluid conduits 152 and 154 and hence between the fluid chambers 158 and 162 may be desirable to offset this loading effect. Also, the side of the output piston 160 exposed to fluid within fluid chamber 162 is less in area than the other side of the piston 160 in that the output shaft 163 must be provided, this requires a small fluid pressure differential. The mid position of the control transfer valve 144 is illustrated in Figure 2 and indicates that a stable position has been accquired by the guide vanes 34.

Reducing or decreasing engine speed will have the opposite effect from that described above relative to an increase in engine speed.

The above description relative to the positioning of the guide vanes 34 for a change in engine speed was based upon a substantially constant ambient temperature at the engine compressor inlet as detected by temperature responsive member 104. However assuming that the engine speed has been stabilized at some steady state value within the range of the guide vane operation, an increase in ambient or inlet air temperature as detected by the temperature responsive member 104 will move the temperature piston 102 to the right as illustrated in Figure 2 to present a higher cam rise to the cam follower 120 due to the contour surface of the guide vane cam 100. The resultant action will be the opposite of that described for an increase in engine speed and in effect will result in an angular positioning of the guide vane 34 in a closing direction in response to increase inlet air temperature. In this respect, the fully closed position of the guide vanes 34 corresponds to angular position of approximately 35 degrees relative to the main direction of air flow through the gas turbine engine 10.

The engine compressor stall region is in practice avoided by a combination of the effect of the acceleration fuel flow as determined by the main fuel control 30 as more fully explained in the above referred to copending application Serial No. 499,432 filed on April 5, 1955 along with the action of the engine guide vanes 34 to control the volume of air entering the engine compressor 16 as shown in Figure 1 as a function of temperature and speed. At a higher compressor inlet air temperature the feedback stroke will start to move at a higher engine speed.

One readily apparent advantage of using an independent fluid pump 43 and a servo type or transfer control valve 144 to control the angular position of the guide vanes 34 is that in actual practice higher fluid pressures may be obtained from the fluid pump 43 which pressure may be in the order of 3,000 pounds per square inch or greater or less as may be desired as compared to the outlet pressure $P_1$ available from the main fuel pump 42. In actual practice the latter pressure $P_1$ may be in the order of 100 to 900 pounds per square inch. In this respect the output control piston 160 may be made physically smaller to get the required output force to position the guide vanes 34 and by using the higher fluid pressures available from the fluid pump 43 than would be required if the output pressure $P_1$ of the main fuel pump 42 were employed for this purpose. It should be here noted that more than one output piston 160 may be provided and connected to the fluid conduits 152 and 154, if desired. Also, it is within the scope of the present invention to operate the transfer valve 144 with output fluid at pressure $P_1$ from the fluid pump 42, instead of providing the separate and perhaps higher pressure fluid pump 43. Also, if desired, the servo piston 130 as well as the transfer valve 144 may be operated by fluid sources independent of the metered fuel supply to the engine, such that pumps 42 and 43 may be used to pump either fuel, as supplied to the engine, or some other control fluid. Also, the servo piston 130 need not be of the servo operated type, if desired.

Although only one embodiment of the present invention has been illustrated and described it will be apparent to those skilled in the art that various changes in the form and relative arrangement of parts may be made to suit individual requirements without departing from the spirit and scope of the present invention.

I claim:

1. In a control apparatus for a gas turbine engine including an adjustable air flow guide member, a combination of piston means connected to said guide member and operable to control the air flow controlling position thereof, a transfer control valve operative to control said piston means in response to an input signal, lever means connected to said transfer control valve and operable to supply said input signal that varies with the position of said lever means, a three dimensional cam member movable in an axial and a rotational direction and having a surface contoured to produce an output representative of the desired guide member position, engine speed responsive means and means responsive to an additional engine parameter each separately operative to position said cam member in one of said axial and rotational directions, said cam member connected to said lever means to position said lever means as a function of the desired guide member position, flexible cable feedback means connected to said guide member and to said lever means to position said lever means as a function of the actual position of said guide member, said cam member and said feedback means further operable with said lever means such that the resultant controlling position thereof is a function of the error between said desired and actual guide member position.

2. In control apparatus as claimed in claim 1 wherein said means responsive to an additional engine parameter is responsive to an engine operating temperature and is operative to position said cam member axially and said cam is rotationally positioned by said engine speed responsive means.

3. In control apparatus for a gas turbine engine having an adjustable air flow guide member, the combination of an output piston having a first and second side connected to said adjustable guide member for controlling the air flow guiding position thereof, a high pressure control fluid source, a low pressure control fluid source, conduit means interconnecting said high and low pressure sources to said output piston, a transfer valve disposed in said conduit means having a first and second position, said transfer valve operative when in said first position to interconnect said first side of said output piston to said high pressure source and said second side of said output piston to said low pressure source, said transfer valve being further operative when in said second position to interconnect said first side of said output piston to said low pressure source and said second side of said output piston to said high pressure source, a movable lever having a first and second end and including a pivotal support point intermediate said ends, said first end of said movable lever being connected to said transfer valve to position said transfer valve in said first or second position in response to the position of said movable lever, a rotating positioning member connected to said second end of said movable lever and operative to position said movable lever about said pivotal point in response to the rotational position changes of said rotating positioning member, a flexible cable interconnecting said air flow guide member and said rotating positioning member to rotate said positioning member in response to changes in position of said air flow guide member, a three dimensional cam member positionally responsive to engine temperature and speed and having a contoured surface formed thereon, and a pivotally secured cam follower in contactive engagement with said three dimensional cam member on one end and operatively connected at said pivotal point of said movable lever to position said lever in response to variations in the contour of said cam member induced by engine speed and temperature variations.

4. In a control apparatus for a gas turbine engine including an adjustable air flow guide member, a combination of piston means connected to said guide member and operable to control the air flow controlling position thereof, a movable transfer valve fluidly connected to said piston means to control the movement thereof, said transfer valve having a null position operative to maintain said piston means and said guide member in a stable position and being further operative to control the rate and direction of movement of said piston means and said guide member responsively to the degree and direction of departure of said transfer valve from said null position respectively, a control lever connected at one end to said transfer valve and having a movable pivot, three dimensional cam means responsive to two engine conditions of operation operatively connected to said movable pivot to control the position thereof in response to variations in the engine conditions, a rotatable sheave operatively connected to another end of said control lever and operative to position said control lever in response to the rotational position of said sheave, and a flexible cable connected to said piston means and said sheave to position said sheave rotationally in response to movement of said piston means.

5. In control apparatus as claimed in claim 4 wherein said three dimensional cam means includes a three dimensional cam member responsively positioned by said engine conditions and a pivotally secured follower member having two ends, one end of said follower member being in contactive engagement with said cam member such that said follower is pivoted in response to cam variations, and the other end of said follower being operatively connected to said movable pivot of said control lever.

References Cited in the file of this patent
UNITED STATES PATENTS

| | | |
|---|---|---|
| 1,231,257 | Herr | June 26, 1917 |
| 1,515,173 | Roucka | Nov. 11, 1924 |
| 2,404,552 | Van Der Werff | July 23, 1946 |
| 2,480,621 | Warner | Aug. 30, 1949 |
| 2,570,847 | Ovens | Oct. 9, 1951 |
| 2,590,199 | Muzzey | Mar. 25, 1952 |
| 2,648,195 | Wilde et al. | Aug. 11, 1953 |
| 2,705,590 | Lovesey et al. | Apr. 5, 1955 |
| 2,781,744 | Williams | Feb. 19, 1957 |
| 2,796,136 | Mock | June 18, 1957 |
| 2,802,335 | Skellern | Aug. 13, 1957 |
| 2,807,138 | Torell | Sept. 24, 1957 |
| 2,824,426 | Rowe et al. | Feb. 25, 1958 |